United States Patent
Alameh et al.

(10) Patent No.: US 9,753,136 B2
(45) Date of Patent: Sep. 5, 2017

(54) PORTABLE ELECTRONIC DEVICE WITH PROXIMITY SENSORS FOR GESTURE CONTROL AND CONTACT DETECTION

(71) Applicant: Motorola Mobility LLC, Chicago, IL (US)

(72) Inventors: Rachid M Alameh, Crystal Lake, IL (US); Justin Douglas Eltoft, Pleasant Prairie, WI (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/619,263

(22) Filed: Feb. 11, 2015

(65) Prior Publication Data
US 2016/0234365 A1    Aug. 11, 2016

(51) Int. Cl.
*H04M 1/00* (2006.01)
*G01S 17/02* (2006.01)
(Continued)

(52) U.S. Cl.
CPC ............ *G01S 17/026* (2013.01); *G01S 17/87* (2013.01); *G01S 17/88* (2013.01); *H04W 52/0254* (2013.01); *G01S 7/4808* (2013.01); *G01S 7/4813* (2013.01); *G06F 3/017* (2013.01); *G06F 3/0421* (2013.01); *H04M 2250/12* (2013.01); *H04M 2250/22* (2013.01); *Y02B 60/50* (2013.01)

(58) Field of Classification Search
CPC .. H04M 1/0295; G01S 7/4808; G01S 17/026; H04W 52/0254; G06F 3/0421; G06F 3/017
See application file for complete search history.

(56) References Cited

U.S. PATENT DOCUMENTS

| | | | |
|---|---|---|---|
| 2011/0019205 A1* | 1/2011 | Gerber | G06K 9/00355 356/615 |
| 2011/0050575 A1 | 3/2011 | Krahenbuhl et al. | |

(Continued)

OTHER PUBLICATIONS

Rachid M. Alameh, et al., "Portable Electronic Device with Dual Diagonal Proximity Sensors and Mode Switching Functionality", U.S. Appl. No. 14/595,257, filed Jan. 13, 2015, 40 pages.
(Continued)

*Primary Examiner* — Barry Taylor
(74) *Attorney, Agent, or Firm* — Philip H. Burrus, IV

(57) ABSTRACT

A portable electronic device includes a housing having at least one major face. One or more processors are operable in the device. At least two discrete signal emitters are disposed along the at least one major face. At least two discrete signal receivers are also disposed along the at least one major face. A first discrete signal emitter is proximately located with a first discrete signal receiver to form a first discrete signal emitter-receiver pair, while a second discrete signal emitter is proximately located with a second discrete signal receiver to form a second discrete signal emitter-receiver pair. The first discrete signal emitter-receiver pair is distally located along the at least one major face from the second discrete signal emitter-receiver pair, and can receive gesture input in a first mode of operation and proximity input in a second mode of operation.

20 Claims, 9 Drawing Sheets

(51) Int. Cl.
  *H04W 52/02* (2009.01)
  *G01S 17/87* (2006.01)
  *G01S 17/88* (2006.01)
  G01S 7/48 (2006.01)
  G06F 3/01 (2006.01)
  G06F 3/042 (2006.01)
  G01S 7/481 (2006.01)

(56) References Cited

U.S. PATENT DOCUMENTS

| | | |
|---|---|---|
| 2012/0172085 A1 | 7/2012 | Vuppu et al. |
| 2012/0312956 A1* | 12/2012 | Chang .................. G06F 3/017 250/201.1 |
| 2013/0207936 A1* | 8/2013 | Theimer ............... G06F 3/0488 345/175 |
| 2014/0027606 A1* | 1/2014 | Raynor ................ G06F 3/0421 250/205 |
| 2014/0155753 A1* | 6/2014 | McGuire, Jr. ........ A61B 5/6833 600/473 |
| 2014/0176447 A1 | 6/2014 | Alameh et al. |
| 2014/0347188 A1 | 11/2014 | Alameh et al. |
| 2015/0009120 A1 | 1/2015 | Jiang et al. |
| 2015/0346911 A1* | 12/2015 | Christiansson ....... G06F 3/0421 345/175 |

OTHER PUBLICATIONS

Rachid M. Alameh, et al., "Portable Electronic Device with Dual Diagonal Proximity Sensors and Mode Switching Functionality", U.S. Appl. No. 14/595,258, filed Jan. 13, 2015, 38 pages.

Rachid M. Alameh, et al., "Portable Electronic Device with Dual, Diagonal Proximity Sensors and Mode Switching Functionality"; U.S. Appl. No. 14/595,261, filed Jan. 13, 2015, 35 pages.

Rachid M. Alameh, et al., "Adaptive Filtering for Presence Detection", U.S. Appl. No. 14/620,257, filed Feb. 12, 2015, 27 pages.

* cited by examiner

PORTABLE ELECTRONIC DEVICE WITH PROXIMITY SENSORS FOR GESTURE CONTROL AND CONTACT DETECTION

BACKGROUND

Technical Field

This disclosure relates generally to electronic devices, and more particularly to portable electronic devices having proximity sensors.

Background Art

Proximity sensors detect the presence of nearby objects adjacent to a device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor.

Electronic devices employ proximity sensors in different ways. In one application, a device may use a proximity sensor to manage power consumption of audio and video devices. For example, a proximity sensor may detect that a device is adjacent to a user's face, such as when the user is using the device for a telephone call. When this occurs, the device may turn OFF the display to save power. In another example, when a device determines that a user's face is adjacent to the device, the device may reduce speaker volume so as not to over stimulate the user's eardrums.

Prior art proximity detectors suffer from several issues. First, they generally work at only a very close range. Accordingly, an object may need to be within, say, five millimeters of a proximity detector to be properly detected. Second, proximity sensors only detect objects within a small area about the proximity sensor itself. Consequently, the use of one or two proximity sensors on an electronic device creates "blind spots" in which objects may not be detected. It would be advantageous to have an improved proximity detection apparatus and method.

Figure 1:
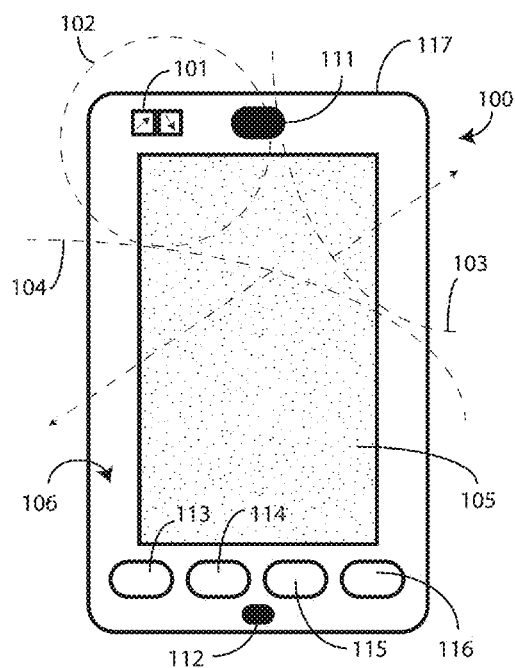
FIG. 1 illustrates a prior art device utilizing a proximity sensor device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using discrete proximity sensor components to detect both gesture and proximity input in an electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling discrete proximity sensors to optionally detect gesture input occurring a first distance from an electronic device, such as nine to ten centimeters, and proximity input occurring a second distance from the device, such as a few millimeters or less, as described herein. The non-processor circuits may include, but are not limited to, a radio receiver, a radio transmitter, signal drivers, clock circuits, power source circuits, and user input devices. As such, these functions may be interpreted as steps of a method to detect gesture input or device contact with external objects with one or more discrete proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 2:
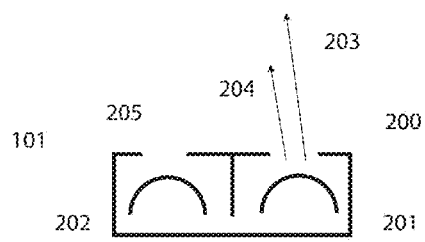
FIG. 2 illustrates a prior art proximity sensor device.

Beginning with FIG. 1, illustrated therein is a prior art electronic device 100 that utilizes a proximity sensor device 101. As shown in FIG. 2, the proximity sensor device 101 includes a light emitting diode 201 and a photodiode 202. The light emitting diode 201 and the photodiode 202 are placed into a special, opaque housing 200 that prevents light 203 from locally coupling to the photodiode 202 from the light emitting diode 201. Without the special, opaque housing 200, the light emitting diode 201 and the photodiode 202 would need to be physically spaced far apart because local coupling between the two would render these components unable to detect a proximately located object.

As shown in FIG. 2, the special, opaque housing 200 includes a pair of specially designed apertures 204,205 that allow light 203 to be emitted from the light emitting diode 201 and received by the photodiode 202, respectively. In practice, the light emitting diode 201 emits light 203 through the first aperture 204. If that light 203 reflects off an external object, it returns to the photodiode 202 through the second aperture 205. The proximity sensor device 101 is configured as a small, integrated, unitary device so that it can be mounted on a printed circuit board within an electronic device (100).

Turning back to FIG. 1, it can be seen that this proximity sensor device 101 has only a limited area 102 in which it can detect objects proximately located with the electronic device 100. This limited area 102 is small due to the fact that light (203) must pass through an aperture (204) to leave the device. The size of the aperture (204) is restricted to prevent local coupling between the light emitting diode (201) and the photodiode (202). This restricted aperture size results in a limited area 102 in which proximity can be detected.

Accordingly, the prior art electronic device 100 suffers from one or more blind spots 103,104. If an object, such as a user's hand or face, contacts the electronic device 100 within the limited area 102 of the proximity sensor device 101, the device will detect this proximity input. However, if an object contacts the electronic device 100 outside of this range, i.e., in a blind spot 103,104, the object will not be detected. Accordingly, any power saving features responsive to the proximity sensor device 101, such as turning OFF the display 105 when the electronic device 100 detects an object above the display 105, will not work.

The problem of the blind spot issue is compounded due to the fact that the proximity detector device 101 cannot be placed just anywhere along the front surface 106 of the electronic device 100. To the contrary, the electronic device 100 includes a display 105, a loudspeaker 111, a microphone 112, and one or more buttons 113,114,115,116. To minimize the blind spots 103,104, a preferred location for the proximity detector device 101 would be directly in the middle of the front surface 106 of the electronic device 100. However, this would interfere with the display 105. Accordingly, the proximity detector device 101 must be offset from the display 105 to the top 117 of the electronic device 100.

It would also be preferable to place the proximity detector device 101 in the center of the top 117 of the electronic device 100. However, this would interfere with the operation and/or location of the loudspeaker 111. Accordingly, the proximity detector device 101 must also be offset from the loudspeaker 111. This double offset, i.e., once from the display 105 and once from the loudspeaker 111, increases the area of each blind spot 103,104.

A solution to this issue would be to include many different proximity sensor devices across the front surface 106 of the electronic device 100. This solution is unsatisfactory, however, for several reasons. First, adding additional proximity sensor devices is expensive. Second, adding additional proximity sensor devices consumes valuable real estate on the front surface 106 of the electronic device 100, which may result in a reduced display area. Third, the microprocessor of the electronic device 100 has a limited number of inputs and/or outputs. In many modern electronic devices, every single one of these inputs is in use to provide device functionality. Adding additional proximity sensor devices requires additional inputs, which may not be available.

Figure 3:
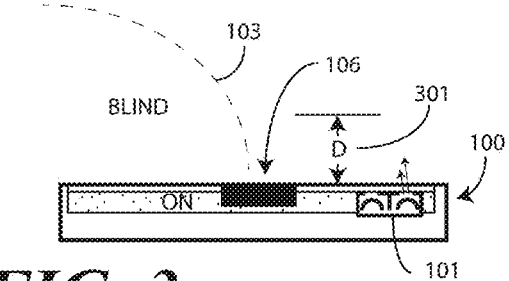
FIG. 3 illustrates a prior art device having a proximity sensor device in sectional view.

Turning to FIG. 3, a second disadvantage of using the proximity sensor device 101 is shown. In addition to the creation of blind spots 103, the proximity sensor device 101 is only operable to detect objects within a very low distance 301 above the front surface 106 electronic device 100. For example, in most proximity sensor devices commercially available today this distance 301 is between a few millimeters and a few centimeters. Thus, the proximity sensor device 101 cannot detect objects beyond this distance 301.

Figure 4:
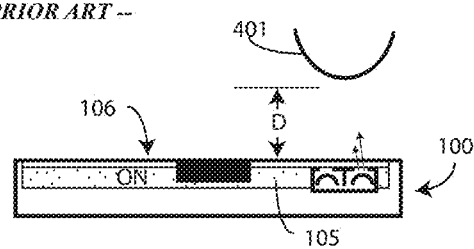
FIG. 4 illustrates a prior art device having a proximity sensor device in use.

This is shown in FIG. 4. An object 401 is approaching the electronic device 100 from above the front surface 106. This particular electronic device 100 is equipped with a feature to turn the display 105 OFF when an object is proximately located with the display 105. However, this feature is not operational at the moment because the object 401 of FIG. 4 is more than five millimeters above the front surface 106. Consequently, the display 105 remains ON, consuming valuable power that may unnecessarily deplete the battery or energy source of the electronic device 100. Such a situation would be problematic for a user who holds the electronic device 100 a few centimeters from their face when conducting telephone calls, as the display would remain ON during this time consuming power.

Figure 5:
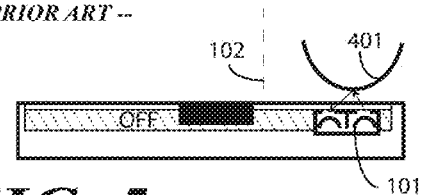
FIG. 5 illustrates a prior art device having a proximity sensor device in use.
Figure 6:
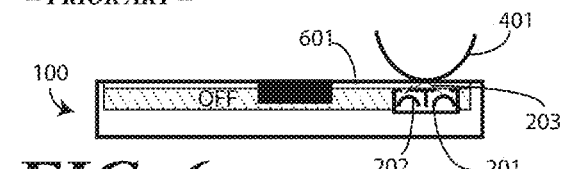
FIG. 6 illustrates a prior art device having a proximity sensor device in use.

As shown in FIG. 5, once the object 401 is less than the distance (301) from the front surface 106, and within the limited area 102 of the proximity sensor device 101, proximity input is detected and the display 105 is turned OFF to save power. As shown in FIG. 6, once the object 401 contacts the front surface 106 of the electronic device 100, light 203 from the light emitting diode 201 reflects from the object 401 to the photodiode 202 through the glass fascia 601 of the electronic device 100 without ever leaving the electronic device 100.

Figure 7:
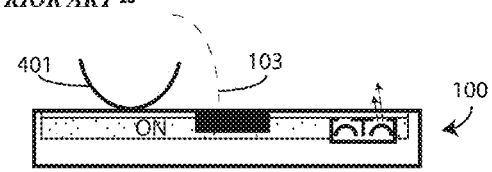
FIG. 7 illustrates a prior art device having a proximity sensor device in use.

Turning to FIG. 7, in this environment the object 401 contacts the front surface 106 electronic device 100 within the blind spot 103. Accordingly, the proximity sensor device 101 fails to detect the object 401, illustrating another disadvantage of using a proximity sensor device 101. Consequently, the display 105 remains ON, consuming valuable power that may unnecessarily deplete the battery or energy source of the electronic device 100.

Thus, as shown in FIGS. 1-7, proximity sensor devices 101 suffer from two primary issues: First, they have a limited area 102 in which they can detect objects. This results in blind spots along the front surface 106 of the electronic device 100. Second, they only work within a limited distance 301 from the electronic device 100. While useful for detecting proximity input, they cannot therefore be used to detect other forms of user input such as gesture input.

Figure 8:
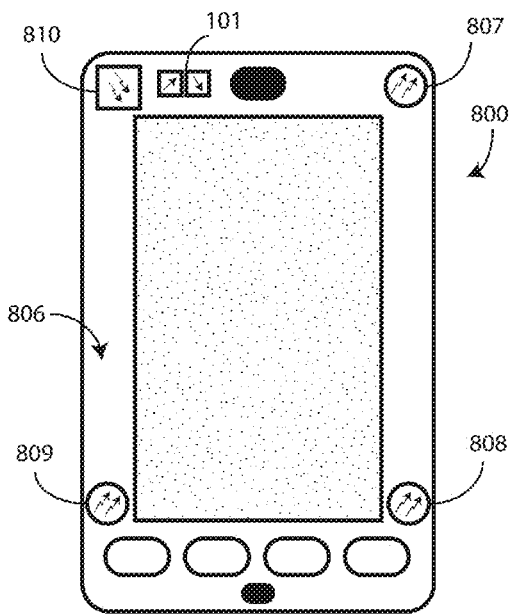
FIG. 8 illustrates another prior art device.

Turning now to FIG. 8, illustrated therein is another prior art device 800. As with the prior art electronic device (100) of FIGS. 1-7, the prior art device 800 of FIG. 8 uses a proximity detector device 101 to detect proximity input from objects proximately located with a front surface 806 of the electronic device 800. As shown, only one proximity detector device 101 is used in prior art device 800. Consequently, prior art device 800 will suffer from the same blind spot issues as the prior art electronic device (100) of FIGS. 1-7.

The electronic device 800 of FIG. 8 differs from that of FIGS. 1-7 in that it also includes three discrete light emitting diodes 807,808,809 to detect gesture input. The discrete light emitting diodes 807,808,809 are larger and more powerful than, for example, is the light emitting diode (201) of the proximity detector device 101. Additionally, the discrete light emitting diodes 807,808,809 are not constrained in a special, opaque housing (200) with apertures (204,205) as is the light emitting diode (201) of the proximity detector device 101. Consequently, each discrete light emitting diode 807,808,809 can emit light for reflection to a discrete photodiode 810 at far greater distances than can the light emitting diode (201) of the proximity detector device 101.

Figure 9:
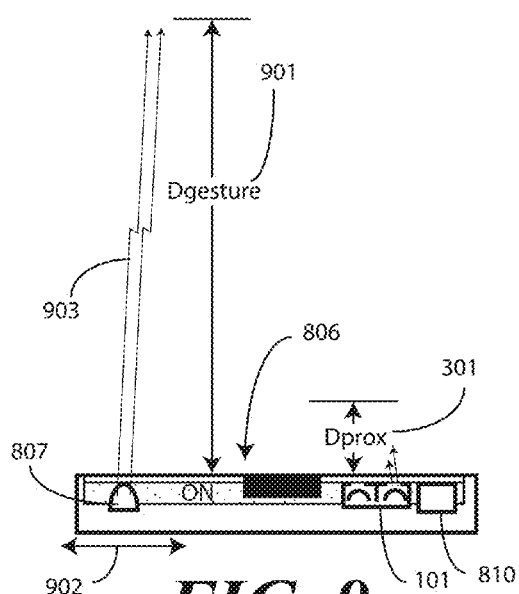
FIG. 9 illustrates another prior art device in sectional view.

This is shown in FIG. 9. Discrete light emitting diode 807 can emit light 903 for reflection from objects a greater distance 901 than the distance 301 within which the proximity detector device 101 is effective. Consequently, the combination of the discrete light emitting diode 807 and the discrete photodiode 810 can detect gesture input at a greater distance 901 from the front surface 806 than can the proximity detector device 101.

One may initially inquire as to why, if the discrete light emitting diode 807 and the discrete photodiode 810 can be used to detect gestures, they cannot also be used to detect proximity input. As noted above, the discrete light emitting diode 807 is not disposed within a special, opaque housing (200). Consequently, when it is placed near the discrete photodiode 810, cross coupling becomes a significant problem. Accordingly, the discrete light emitting diode 807 must be separated from any discrete photodiode 810 by a predefined distance 902 to prevent local coupling. This predefined distance 902 presents a problem in all prior art devices, in that both discrete components for gesture detection and a proximity detector device 101 are required.

Prior art attempts at solving this problem involve moving the discrete light emitting diode 807 closer to the discrete photodiode 810 and placing the discrete light emitting diode 807 in a special grommet. The grommet serves, essentially, as a special housing for the discrete light emitting diode 807 to prevent local coupling to the discrete photodiode 810. However, including a grommet that allows the discrete light emitting diode 807 to be placed close to the discrete photodiode 810 increases the size of blind spots, while including a grommet that reduces blind spots increases local coupling. This occurs because each problem is in conflict. Said differently, solving one issue only makes the other worse, and vice versa.

Turning back to FIG. 8, note that three discrete light emitting diodes 807,808,809 are shown. Three components are required for gesture detection in three dimensions. A single discrete photodiode 810 can be used. In one embodiment, the three discrete light emitting diodes 807,808,809 can be actuated sequentially, with the discrete photodiode 810 receiving light from each discrete light emitting diode 807,808,809 at a different time. For example, a time division-multiplexing algorithm can be used to fire each discrete light emitting diode 807,808,809. A control circuit may fire the first discrete light emitting diode 807, then the second, then the third, and then fire the proximity detector device 101 in one embodiment.

Note that each discrete light emitting diode 807,808,809 and the discrete photodiode 810 are placed in opposite corners of the electronic device 800. This is required in the prior art solution for at least two reasons. First, separating the discrete light emitting diodes 807,808,809 and the discrete photodiode 810 helps to eliminate gesture detection blind spots. Second, this separation prevents local coupling between any one of the discrete light emitting diodes 807, 808,809 and the discrete photodiode 810.

This separation, however, presents problems. Specifically, the size of the discrete photodiode 810 must be very large. For example, in many prior art designs the discrete photodiode 810 must have a reception surface area of at least four square millimeters to ensure that light (903) can be reflected from any one of the discrete light emitting diodes 807,808, 809 at a distance (901) of about nine centimeters. This large discrete photodiode 810 is problematic in that it consumes a large amount of real estate along the front surface 806 of the electronic device 100.

Figure 10:
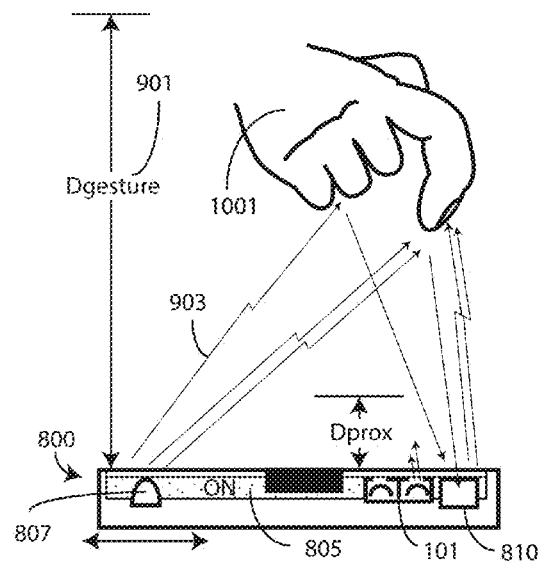
FIG. 10 illustrates another prior art device in use.
Figure 11:
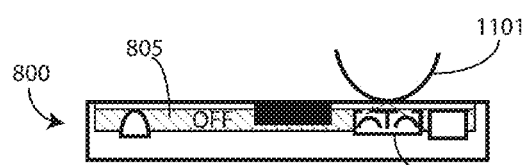
FIG. 11 illustrates another prior art device in use.
Figure 12:
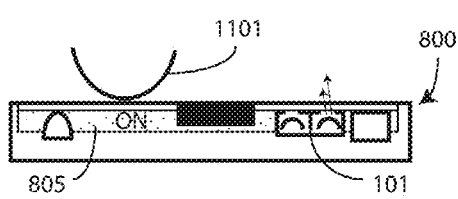
FIG. 12 illustrates another prior art device in use.

The prior art device 800 is shown in use in FIGS. 10-12. As shown in FIG. 10, a user 1001 is delivering gesture input. Light 903 from one or more of the discrete light emitting diodes 807 reflects to the discrete photodiode 810 and is interpreted as gesture input. Due to the strength of the discrete light emitting diodes 807, this gesture input can be detected at a distance 901 of five to nine centimeters. This particular electronic device 800 is equipped with a feature to turn the display 805 OFF when an object is proximately located with the display 805. Since the gesture input occurs above the distance 301 at which the proximity detector device 101 is operable, the display 805 remains ON.

As shown in FIG. 11, once an object 1101 is less than the distance (301) from the front surface 806 of the electronic device, and within the limited area (102) of the proximity sensor device 101, proximity input is detected and the display 805 is turned OFF to save power. However, in FIG. 12, as with FIG. 7 above, when the object 1101 contacts the front surface 806 electronic device 800 within a blind spot, the proximity sensor device 101 fails to detect the object 1101. Consequently, the display 805 remains ON, consuming valuable power that may unnecessarily deplete the battery or energy source of the electronic device 800.

Consequently, while the electronic device 800 of FIGS. 8-12 is capable of detecting both gesture and proximity input, it still suffers from deficiencies. First, it requires the proximity sensor device 101, which is an expensive component. Moreover, the proximity sensor device 101 has a limited active distance above the front surface 806 of the electronic device 800 and suffers from blind spots. Second, while discrete light emitting diodes 807,808,809 and a discrete photodiode 810 are included to detect gesture input, they are ineffective at detecting proximity input due to the large amounts of local coupling that would occur if these components were placed close together.

Embodiments of the present disclosure provide solutions to these issues. Embodiments of the disclosure greatly reduce blind spots during proximity input detection. Embodiments of the disclosure also accurately detect gesture input. What's more, embodiments of the disclosure eliminate the need to include a proximity sensor device. Embodiments of the disclosure provide systems, circuits, and methods that enable proximity input detection with a gesture input detection system using one or more discrete signal transmitters and at least two discrete signal receivers, which are coupled in parallel in on embodiment. Embodiments of the disclosure create a proximity detection system with increased angular diversity that improves the detection of right or left hand operation regardless of device position or tilt. At the same time, embodiments of the disclosure solve the aforementioned blind spot and local coupling issues.

In one embodiment, a portable electronic device includes a housing having at least one major face. One or more processors serve as operations hubs of the electronic device. At least two discrete signal emitters, operable with the one or more processors, are disposed along the major face. Additionally, at least two discrete signal receivers, also operable with the one or more processors, are disposed along the major face. In contrast to prior art designs, in one embodiment a first discrete signal emitter is proximately located with a first discrete signal receiver to form a first discrete signal emitter-receiver pair. Additionally, a second discrete signal emitter is proximately located with a second discrete signal receiver to form a second discrete signal emitter-receiver pair. In one embodiment, the first discrete signal receiver is coupled in parallel with the second discrete signal receiver. In one embodiment, the first discrete signal emitter-receiver pair is distally located along the major face of the electronic device from the second discrete signal emitter-receiver pair.

Since two discrete signal receivers are used, each can be smaller than was the discrete photodiode (810) of FIGS. 8-12. For example, while the discrete photodiode (810) of FIGS. 8-12 had an active reception area of four square millimeters, in one embodiment the first discrete signal receiver and the second discrete signal receiver of embodiments of the disclosure have an active reception area of only two square millimeters, which is half that of the discrete photodiode (810) of FIGS. 8-12.

In one embodiment, the two discrete signal receivers are coupled in parallel so as to emulate, at least to the processors controlling the discrete signal receivers, a single, larger signal receiver. Since they are coupled in parallel, the two discrete signal receivers have the same trans-impedance, in one embodiment, as did the discrete photodiode (810) of FIGS. 8-12. However, since two discrete signal receivers are used, the gain associated with each can be half of that associated with the discrete photodiode (810) of FIGS. 8-12. The combined power reduction between the discrete signal emitters and the discrete signal receivers results in an overall power savings of seventy-five percent compared to the prior art system of FIGS. 8-12.

In one embodiment, the first discrete signal receiver and the second discrete signal receiver are driven at half the power that, for example, would be used to drive a single discrete light emitting diode (807) of FIGS. 8-12 during gesture input detection. Since two discrete signal receivers are being driven, their combined output would be roughly the same as a single discrete light emitting diode (807) of FIGS. 8-12. Accordingly, as each discrete signal receiver has half gain, and each discrete signal is driven at half power, gesture input detection remains the same. However, local coupling between discrete signal emitters and discrete signal receivers is dramatically reduced compared to that associated with the electronic device (800) of FIGS. 8-12.

Meanwhile, since the discrete signal emitters and discrete signal receivers are arranged as a first discrete signal emitter-receiver pair and a second discrete signal emitter-receiver pair, these pairs can be used to detect proximity input as well. This eliminates the need to include a costly proximity sensor device (101). Accordingly, only discrete devices are used to detect both gesture input within large distances, e.g. nine inches, and proximity input at smaller distances, e.g., three inches or so in one or more embodiments.

To illustrate operation by way of an application-specific example, in one embodiment the electronic device can be configured as a smartphone, with the first discrete signal emitter-receiver pair and second discrete signal emitter-receiver pair disposed at the top of the front face above the display and to either side of the loudspeaker. One or more additional discrete signal emitters can be disposed at the base of the display to facilitate detection of gesture input in three dimensions.

The smart phone may be initially configured in a first mode to detect gesture input. Accordingly, the discrete signal emitters can be driven so as to detect gesture input from a first distance, such as nine inches or ten inches. In this mode, each discrete signal emitter at the top of the device will be driven at much lower power than, for example, was the discrete light emitting diode (807) of FIG. 8 due to the fact that two discrete signal emitters are placed at the top of the device rather than one.

In one embodiment the two discrete signal emitters of the first discrete signal emitter-receiver pair and second discrete signal emitter-receiver pair can be independently driven. When the smartphone receives a phone call, and a user places the front face against their cheek to talk on the call. The drive current delivered to each discrete signal emitter can then be reduced to a much lower level to reduce the distance at which object can be detected to something on the order of three inches. Since the power is relatively low, each discrete signal emitter of the first discrete signal emitter-receiver pair and second discrete signal emitter-receiver pair can be placed very close to the corresponding signal discrete receiver without introducing local coupling.

The use of two discrete signal emitters placed close to two discrete signal receivers solves the blind spot issue plaguing prior art designs in which areas are defined where a proximity sensor has trouble detecting the proximity of dark object in contact with sensor. Embodiments of the disclosure solve the blind spot problem by providing discrete signal emitter coverage intersections occurring in the glass fascia of the electronic device. Advantageously, embodiments of the disclosure reduce the number and size of blind spots in comparison to prior art designs. This reduction of blind spots advantageously provides more reliable object detection.

Additionally, the use of the first discrete signal emitter-receiver pair and second discrete signal emitter-receiver pair offers angular diversity in that disposing a discrete signal emitter-receiver pairs at each corner of the device allows the corresponding system to detect either right hand or left hand operation. The system can also detect the angular skew that occurs, for example, if the device is not placed flat against a surface such as the user's cheek during a call. Advantageously, the first discrete signal emitter-receiver pair and second discrete signal emitter-receiver pair work together as a "super" proximity detector, which is in addition to working as gesture input detectors. Both will detect objects proximately located with the surface of the device. However, the dual nature facilitates additional features being based upon determining which discrete signal emitter is more saturated as a function of, for example, device tilt. Using embodiments of the disclosure, additional features to be based upon angular skew can be added to an electronic device. Such features are not possible with prior art designs. Even in basic touch detection modes of operation, the use of the first discrete signal emitter-receiver pair and second discrete signal emitter-receiver pair is a more reliable system due to redundancy that can overcome component failures in either the first discrete signal emitter-receiver pair or the second discrete signal emitter-receiver pair. Another benefit of embodiments of the disclosure is that a better approach coverage for gesture detection occurs due to the fact that four discrete signal emitters are driven during gesture detection. This is in contrast to the three light emitting diodes used in the prior art of FIG. 8, for example.

Figure 13:
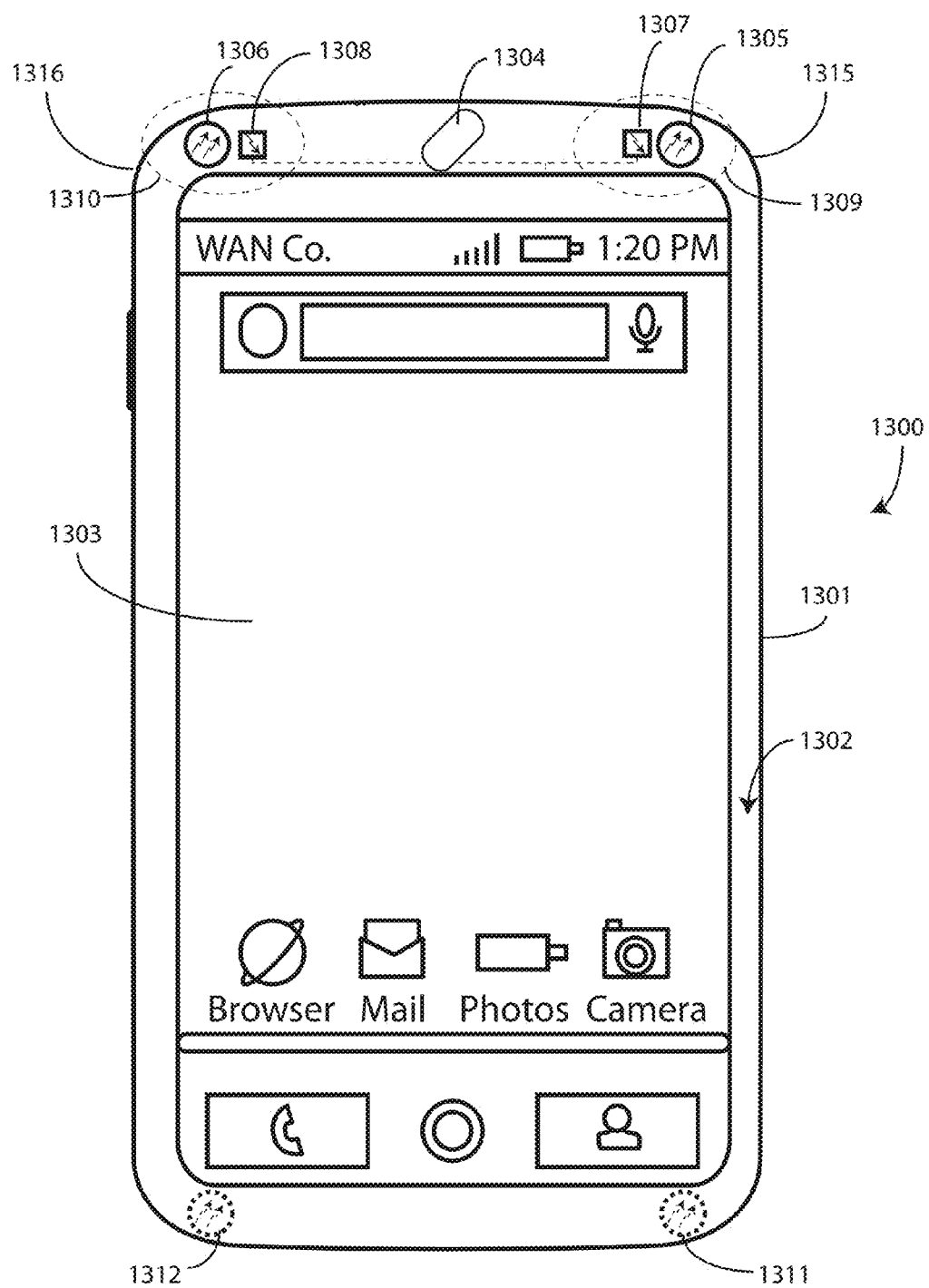
FIG. 13 illustrates one explanatory device in accordance with one or more embodiments of the disclosure.

Turning now to FIG. 13, illustrated therein is a portable electronic device 1300 configured in accordance with one or more embodiments of the disclosure. The portable electronic device 1300 includes a housing 1301 that defines at least one major face 1302. In this embodiment, the at least one major face 1302 is the front face, and includes a display 1303 and a loudspeaker 1304. Within the portable electronic device 1300, as will be shown in more detail in FIG. 17 below, are one or more processors that are operable with the display 1303, loudspeaker 1304, and other components of the portable electronic device 1300.

In one embodiment, at least two discrete signal emitters 1305,1306 and at least two discrete signal receiver 1307, 1308 are disposed along the at least one major face 1302. As used herein, the term "discrete" means that a component is a standalone component that is not electrically integrated with another component such that its operation depends upon that other component. For example, the proximity detector device (101) of FIG. 1 included a light emitting diode (201) and a photodiode (202) that were integrated together and had a codependent operation that yields a binary proximity detection output in operation due to the codependency of operation. By contrast, the discrete signal emitter 1305 has no such codependency. Accordingly, it would not provide—as a single component—gesture or contact detection. It instead requires one or more discrete signal receivers 1307,1308, which are operated independently from the discrete signal emitter 1305.

Additionally, as used herein "discrete" components are capable of operating at higher power levels than are integrated components. As mentioned above, the proximity detector device (101) of FIG. 1 has a very limited distance at which it can detect reflected signals, e.g., a few millimeters. Due to the fact that the discrete signal emitters 1305, 1306 can be driven independently, they can be driven at higher power levels such that the discrete signal receivers 1307,1308 can receive reflected signals from much larger distances, e.g., nine to ten inches.

Next, as used herein "discrete" components can be driven at varying power levels. As noted above, in one embodiment the system does not require a proximity detector device (101), yet can be used to detect gesture input at large distances and proximity input at closer distances. This duality of function is achieved by driving, for example, each of the discrete signal emitters 1305,1306 at a higher power while detecting gesture input, and at lower power when detecting proximity input.

Each proximity sensor component can be one of various types of proximity sensors, such as but not limited to, capacitive, magnetic, inductive, optical/photoelectric, laser, acoustic/sonic, radar-based, Doppler-based, thermal, and radiation-based proximity sensors. For example, each of the discrete signal emitters 1305,1306 can be an infrared signal emitter that transmits a beam of infrared (IR) light. Similarly, the discrete signal receivers 1307,1308 can be an infrared signal receiver that receives a reflected, return signal and delivers a corresponding electronic signal to one or more processors that then compute the distance to any nearby objects from characteristics of the returned, reflected signal. The discrete signal emitters 1305,1306 can be, in one embodiment, a double-spec infrared light emitting diode that emits infrared light. The discrete signal emitters 1307,1308 can be photodiodes having active signal receiving areas of two square millimeters in one embodiment.

In one embodiment, each of the discrete signal emitters 1305,1306 and the discrete signal receivers 1307,1308 is operable with the one or more processors operating within the portable electronic device 1300. In one embodiment, a first discrete signal emitter 1305 is proximately located with a first discrete signal receiver 1307 to form a first discrete signal emitter-receiver pair 1309. Similarly, a second discrete signal emitter 1306 is proximately located with a second discrete signal receiver 1308 to form a second discrete signal emitter-receiver pair 1310. In one or more embodiments, the first discrete signal emitter-receiver pair 1309 is distally located along the at least one major face 1302 from the second discrete signal emitter-receiver pair 1310.

In this illustrative embodiment, the loudspeaker 1304 defines an audio output device that is operable with the one or more processors of the portable electronic device. The audio output device is situated between the first discrete signal emitter-receiver pair 1309 and the second discrete signal emitter-receiver pair 1310, thereby providing the distal separation. Accordingly, each of the first discrete signal emitter-receiver pair 1309 and the second discrete signal emitter-receiver pair 1310 is disposed at a first corner 1315 of the housing 1301 and a second corner 1316 of the housing 1301 of the portable electronic device 1300, respectively. In this embodiment, these corners 1315,1316 happen to be the two top corners of the housing 1301. Other configurations will be obvious to those of ordinary skill in the art having the benefit of this disclosure. For example, one discrete signal emitter-receiver pair could be disposed at a top corner, while another is disposed at the bottom corner, and so forth.

While many discrete signal emitter-receiver pairs can be included, in one embodiment only two discrete signal receivers 1307,1308 are included in the portable electronic device 1300. Accordingly, in one embodiment only two discrete signal emitter-receiver pairs 1309,1310 are included in the portable electronic device 1300. However, to provide additional gesture detection capabilities in multiple dimensions, in one embodiment a third discrete signal emitter 1311 and a fourth discrete signal emitter 1312 are also disposed along the at least one major face 1302.

In this embodiment, the third discrete signal emitter 1311 and the fourth discrete signal emitter 1312 are disposed opposite the display 1303 from the first discrete signal emitter-receiver pair 1309 and the second discrete signal emitter-receiver pair 1310. Said differently, in this embodiment the loudspeaker 1304, the first discrete signal emitter-receiver pair 1309, and the second discrete signal emitter-receiver pair 1310 are disposed to a first side 1313 of the display 1303. Additionally, as noted above, the loudspeaker 1304 is disposed between the first discrete signal emitter-receiver pair 1309 and the second discrete signal emitter-receiver pair 1310. However, the third discrete signal emitter 1311 and the fourth discrete signal emitter 1312 are disposed to a second side 1314 of the display 1303 that is opposite the first side 1313, thereby providing distal separation of each component between the four corners of the housing 1301 of the portable electronic device 1300.

In one embodiment, the first discrete signal receiver 1307 and the second discrete signal receiver 1308 are electrically coupled in parallel. The parallel coupling offers numerous advantages. To begin, since two discrete signal receivers 1307,1308 are used, each can have a smaller signal receiving surface area than prior art devices. Illustrating by example, for proper gesture detection as described above, the discrete photodiode (810) of FIG. 8 required a signal receiving surface area of about four square millimeters. By contrast, each of the first discrete signal emitter-receiver pair 1309 and the second discrete signal emitter-receiver pair 1310 can have a smaller signal receiving surface area. For example, simulation and testing indicates that, in one embodiment, the first discrete signal emitter-receiver pair 1309 and the second discrete signal emitter-receiver pair 1310 can have a signal receiving surface area that is about half of prior art designs. Accordingly, in one embodiment the first discrete signal emitter-receiver pair 1309 and the second discrete signal emitter-receiver pair 1310 each have an active signal receiving surface area of about two square millimeters.

A second advantage offered by using two discrete signal receivers 1307,1308 coupled in parallel is that each corresponding discrete signal emitter 1305,1306 in the first discrete signal emitter-receiver pair 1309 and the second discrete signal emitter-receiver pair 1310 can be driven at less power than, for example, the discrete light emitting diode (807) of FIG. 8. This reduction in power reduces local coupling between the discrete signal receivers 1307,1308 and their corresponding discrete signal emitters 1305,1306. This reduction in local coupling is what allows the two discrete signal receivers 1307,1308 to be proximately located with their corresponding discrete signal emitters 1305,1306. This proximate location was not possible with prior art designs as the local coupling was too great.

A third advantage of coupling the two discrete signal receivers 1307,1308 in parallel is that the gain of each discrete signal receiver 1307,1308 can be reduced compared to the large, single photodiode (810) of the prior art. In one embodiment, the gain of each discrete signal receiver 1307, 1308 can be cut in half compared to the prior art photodiode (810). This further helps reduce local coupling.

Figure 14:
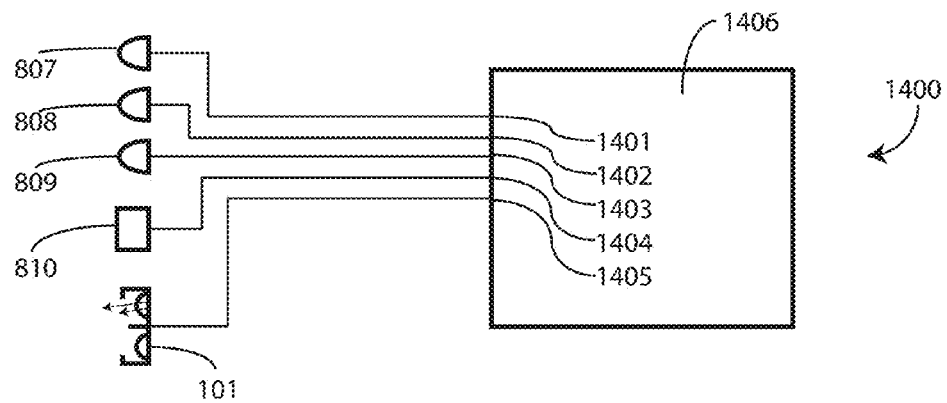
FIG. 14 illustrates a prior art system.
Figure 15:
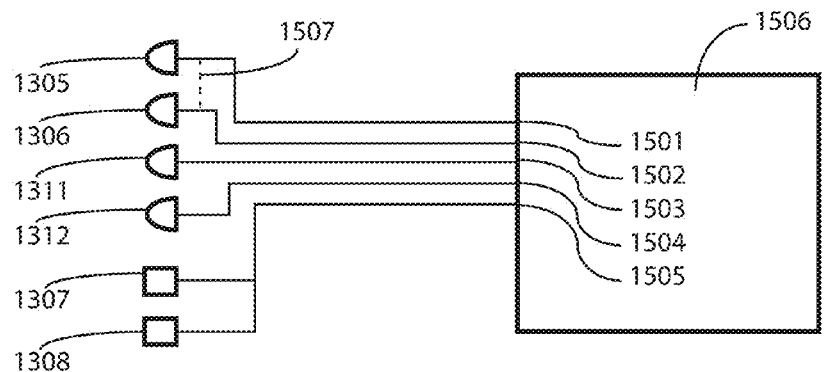
FIG. 15 illustrates an explanatory system including one or more processors, at least two discrete signal emitters, and at least two discrete signal receivers in accordance with one or more embodiments of the disclosure.

A fourth advantage of coupling the two discrete signal receivers 1307,1308 in parallel is shown in FIGS. 14-15. FIG. 14 illustrates a prior art system 1400 used in the electronic device (800) of FIG. 8. Recall from above that three discrete light emitting diodes 807,808,809, a discrete photodiode 810, and a proximity detector device 101 were used to perform combined gesture detection and touch detection. These components required the use of five input and/or output terminals 1401,1402,1403,1404,1405 of a control circuit 1406.

As shown in FIG. 15, with a system configured in accordance with one or more embodiments of the disclosure where the first discrete signal receiver 1307 and the second discrete signal receiver 1308 are coupled in parallel, only a single input and/or output terminal 1505 is required for receiving signals from the first discrete signal receiver 1307 and the second discrete signal receiver 1308. Accordingly, four discrete signal emitters 1305,1306,1311,1312 can be used in conjunction with the first discrete signal receiver 1307 and the second discrete signal receiver 1308 while requiring only five input and/or output terminals 1501,1502, 1503,1504,1505 of one or more processors.

Thus, legacy devices can take advantage of the many benefits of the gesture and touch detection system of embodiments of the disclosure without requiring additional input and/or output terminals. Parallel discrete signal receiver coupling advantageously allows the proximity detection system of FIG. 13 to be used in legacy devices such as the prior art device (800) of FIG. 8 due to the fact that the first discrete signal emitter-receiver pair (1309) and the second discrete signal emitter-receiver pair (1310) require only three input and/or output lines when the first discrete signal receiver 1307 and the second discrete signal receiver 1308 are coupled in parallel.

It should be noted that while many embodiments above illustrate discrete signal emitters coupled in parallel, in other embodiments the discrete signal emitters could be coupled in parallel as well. For example, if an application required the independent use of discrete signal receiver 1307 and discrete signal receiver 1308, but the microprocessor 1506 only included five input and/or output terminals 1501,1502, 1503,1504,1505, discrete signal emitter 1305 and discrete signal emitter 1306 could be coupled in parallel and driven by input and/or output terminal 1501, as indicated by dashed line 1507. Meanwhile, discrete signal emitter 1311 could be coupled to input and/or output terminal 1502, discrete signal emitter 1312 could be coupled to input and/or output terminal 1503, discrete signal receiver 1307 could be coupled to input and/or output terminal 1504, and discrete signal receiver 1308 could be coupled to input and/or output terminal 1505. This would allow discrete signal emitter 1305 and discrete signal emitter 1306 to be driven by a common output, i.e., input and/or output 1501, while discrete signal receiver 1307 and discrete signal receiver 1308 can operate independently by input and/or outputs 1504,1505, respectively. Other variations of coupling discrete signal emitters or discrete signal receivers in parallel will be obvious to those of ordinary skill in the art having the benefit of this disclosure.

Figure 16:
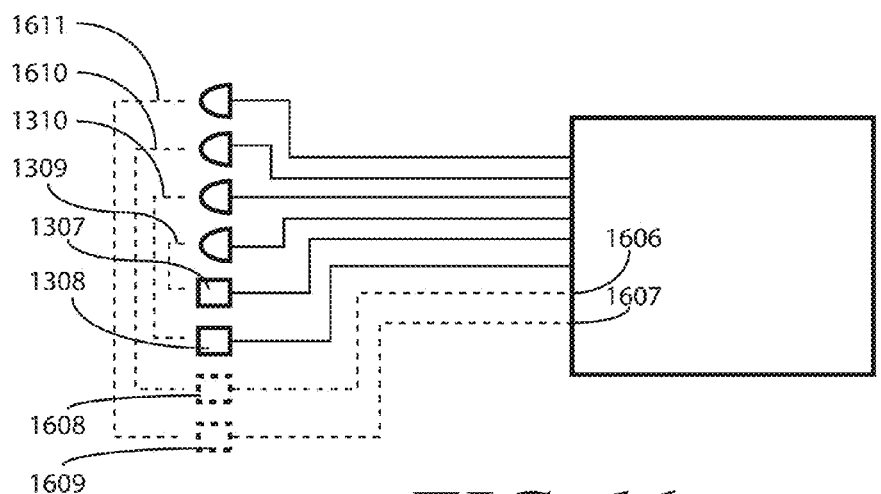
FIG. 16 illustrates another explanatory system including one or more processors, at least two discrete signal emitters, and at least two discrete signal receivers in accordance with one or more embodiments of the disclosure.

As shown in FIG. 16, where more input and/or output terminals 1606,1607 are available, additional discrete signal emitters 1608,1609 can be included to form more discrete signal emitter-receiver pairs 1309,1310,1610,1611. As shown in this figure, coupling any of the discrete signal emitters 1307,1308,1608,1609 in parallel is optional in any embodiments. However, such coupling does provide many of the advantages described above.

Figure 17:
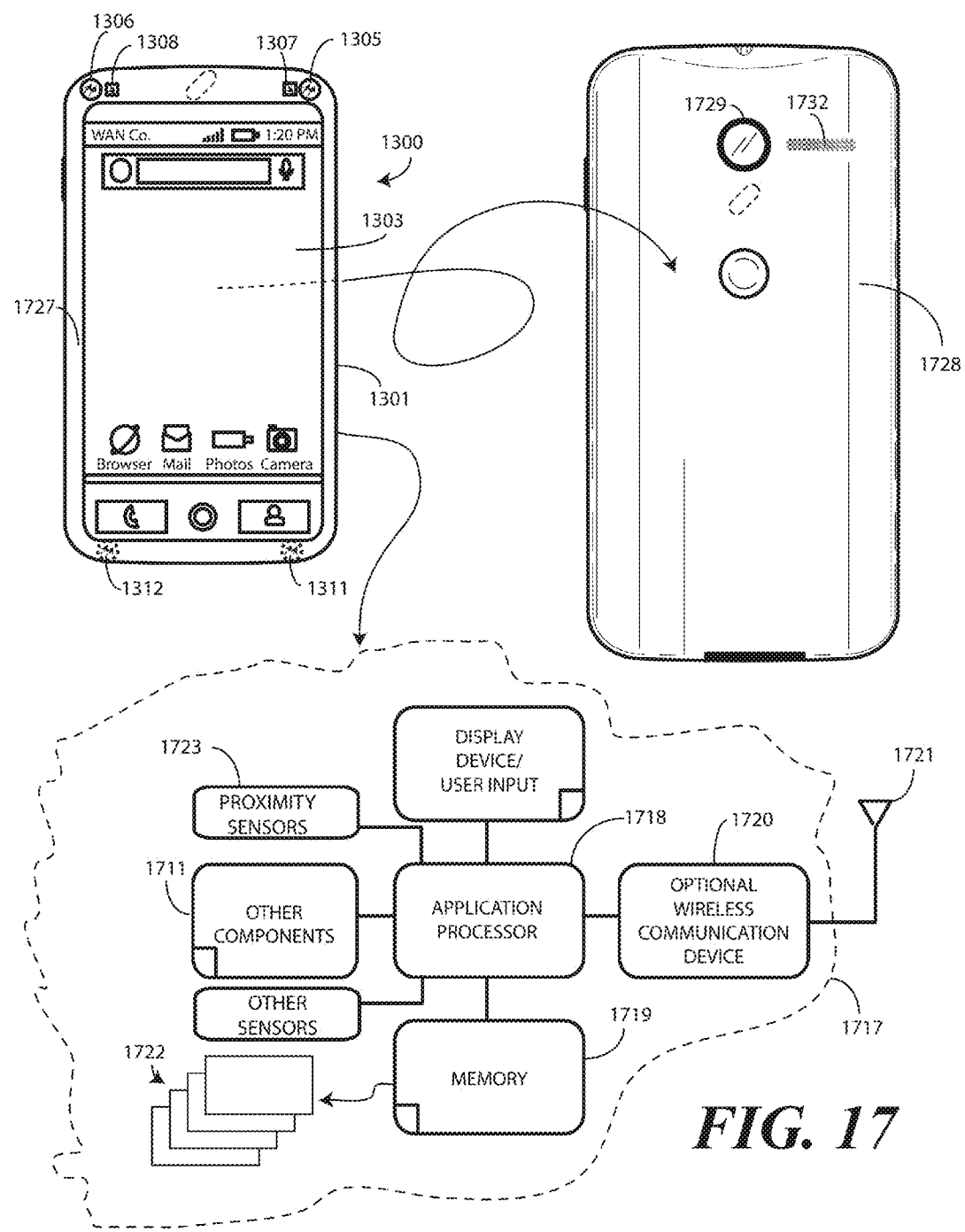
FIG. 17 illustrates an explanatory electronic device in accordance with one or more embodiments of the disclosure.

Turning now to FIG. 17, illustrated therein are additional components of one portable electronic device 1300 configured in accordance with one or more embodiments of the disclosure. It should be noted that for ease of illustration, the portable electronic device 1300 of FIG. 17 is shown as a smartphone. However, it should be obvious to those of ordinary skill in the art having the benefit of this disclosure that the portable electronic device 1300 could take other forms as well. For example, the portable electronic device 1300 could equally be a palm-top computer, a tablet computer, a gaming device, a media player, or other device.

It is to be understood that FIG. 17 is provided for illustrative purposes only and for illustrating components of one portable electronic device 1300 in accordance with embodiments of the disclosure, and is not intended to be a complete schematic diagram of the various components required for an electronic device. Therefore, other electronic devices in accordance with embodiments of the disclosure may include various other components not shown in FIG. 17, or may include a combination of two or more components or a division of a particular component into two or more separate components, and still be within the scope of the present disclosure.

As noted above, the portable electronic device 1300 includes a display 1303. The display 1303 may optionally be touch-sensitive. Users can deliver user input to the display 1303 of such an embodiment by delivering proximity input from a finger, stylus, or other objects disposed proximately with the display. In one embodiment, the display 1303 is configured as an active matrix organic light emitting diode (AMOLED) display. However, it should be noted that other types of displays, including liquid crystal displays, would be obvious to those of ordinary skill in the art having the benefit of this disclosure.

As also noted above, in one embodiment the portable electronic device 1300 includes a housing 1301. In one embodiment, the housing 1301 includes two housing members. A front housing member 1727 is disposed about the periphery of the display 1303. A rear-housing member 1728 can then define the backside of the portable electronic device 1300. Features can be incorporated into the housing members 1727,1728. Examples of such features include an optional camera 1729 or an optional speaker port 1732. Other features will be obvious to those of ordinary skill in the art having the benefit of this disclosure. For example, additional discrete signal emitters or discrete signal receivers could be disposed along the back side of the portable electronic device 1300 to detect gesture and/or proximity input from the rear side.

A block diagram schematic 1717 of the portable electronic device 1300 is shown in FIG. 17. In one embodiment, the portable electronic device 1300 includes one or more processors 1718. The one or more processors 1718 can include a microprocessor, a group of processing components, one or more Application Specific Integrated Circuits (ASICs), programmable logic, or other type of processing device. The one or more processors 1718 can be operable with the various components of the portable electronic device 1300, and can be configured to process and execute executable software code to perform the various functions of the portable electronic device 1300. A storage device, such as memory 1719, can optionally store the executable software code used by the one or more processors 1718 during operation.

In this illustrative embodiment, the portable electronic device 1300 also includes a communication circuit 1720 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 1320 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 1720 can include wireless communication circuitry, one of a receiver, a transmitter, or transceiver, and one or more antennas 1721.

In one embodiment, the one or more processors 1718 can be responsible for performing the primary functions of the portable electronic device 1300. For example, in one embodiment the one or more processors 1718 comprise one or more circuits operable to present presentation information, such as images, text, and video, on the display 1303. The executable software code used by the one or more processors 1718 can be configured as one or more modules 1722 that are operable with the one or more processors 1718. Such modules 1722 can store instructions, control algorithms, and so forth.

The one or more processors 1718 can be operable with various components 1711, such as an audio input component or microphone, and a mechanical input component such as button or key selection sensors, touch pad sensor, touch screen sensor, capacitive sensor, motion sensor, and switch. The other components 1711 can further include one or more of output components such as video, audio, and/or mechanical outputs, or auxiliary devices including a cathode ray tube, liquid crystal display, plasma display, incandescent light, fluorescent light, front or rear projection display, and light emitting diode indicator. The other components 1711 may also include, but are not limited to, accelerometers, touch sensors, surface/housing capacitive sensors, audio sensors, and video sensors (such as a camera). The other components 1711 of the electronic device can include a device interface to provide a direct connection to auxiliary components or accessories for additional or enhanced functionality and a power source, such as a portable battery, for providing power to the other internal components and allow portability of the portable electronic device 1300.

The one or more processors 1718 are operable with the proximity sensor components 1723. In one embodiment, the proximity sensor components 1723 include a first discrete signal emitter 1305 proximately located with a first discrete signal receiver 1307 and a second discrete signal emitter 1306 proximately located with a second discrete signal receiver 1308. In this illustrative embodiment, the second discrete signal emitter 1306 and the second discrete signal receiver 1308 are distally located from the first discrete signal emitter 1305 and the first discrete signal receiver 1306.

In this illustrative embodiment, the proximity sensor components also include a third discrete signal emitter 1311 and a fourth discrete signal emitter 1312. The one or more processors 1718 are operable to drive the two discrete signal receivers 1307,1308 and the four discrete signal emitters

1305,1306,1311,1312 to detect both gesture input and proximity input. In one embodiment, the one or more processors 1718 can drive each of the four discrete signal emitters 1305,1306,1311,1312 independently and at different power levels. In one embodiment, the one or more processors 1718 can detect, from input received from the first discrete signal receiver (1307) and the second discrete signal receiver (1308), gesture input in the first mode of operation and objects adjacent to the portable electronic device in the second mode of operation.

For instance, in one embodiment the one or more processors 1718 are operable to drive the first discrete signal emitter 1305 and the second discrete signal emitter 1306 with less power than the third discrete signal emitter 1311 and the fourth discrete signal emitter 1312 in a first mode of operation to detect gesture input. The top emitters can be driven with less power because they are proximately located with corresponding signal receivers in this embodiment. The one or more processors 1718 can then be operable to drive the first discrete signal emitter 1305 and the second discrete signal emitter 1306 with more power than the third discrete signal emitter 1311 and the fourth discrete signal emitter 1312 in a second mode of operation to detect proximity input from objects disposed adjacent to the at least one major face 1302. For example, the one or more processors 1718 may turn the third discrete signal emitter 1311 and the fourth discrete signal emitter 1312 OFF when in the second mode of operation.

Figure 18:
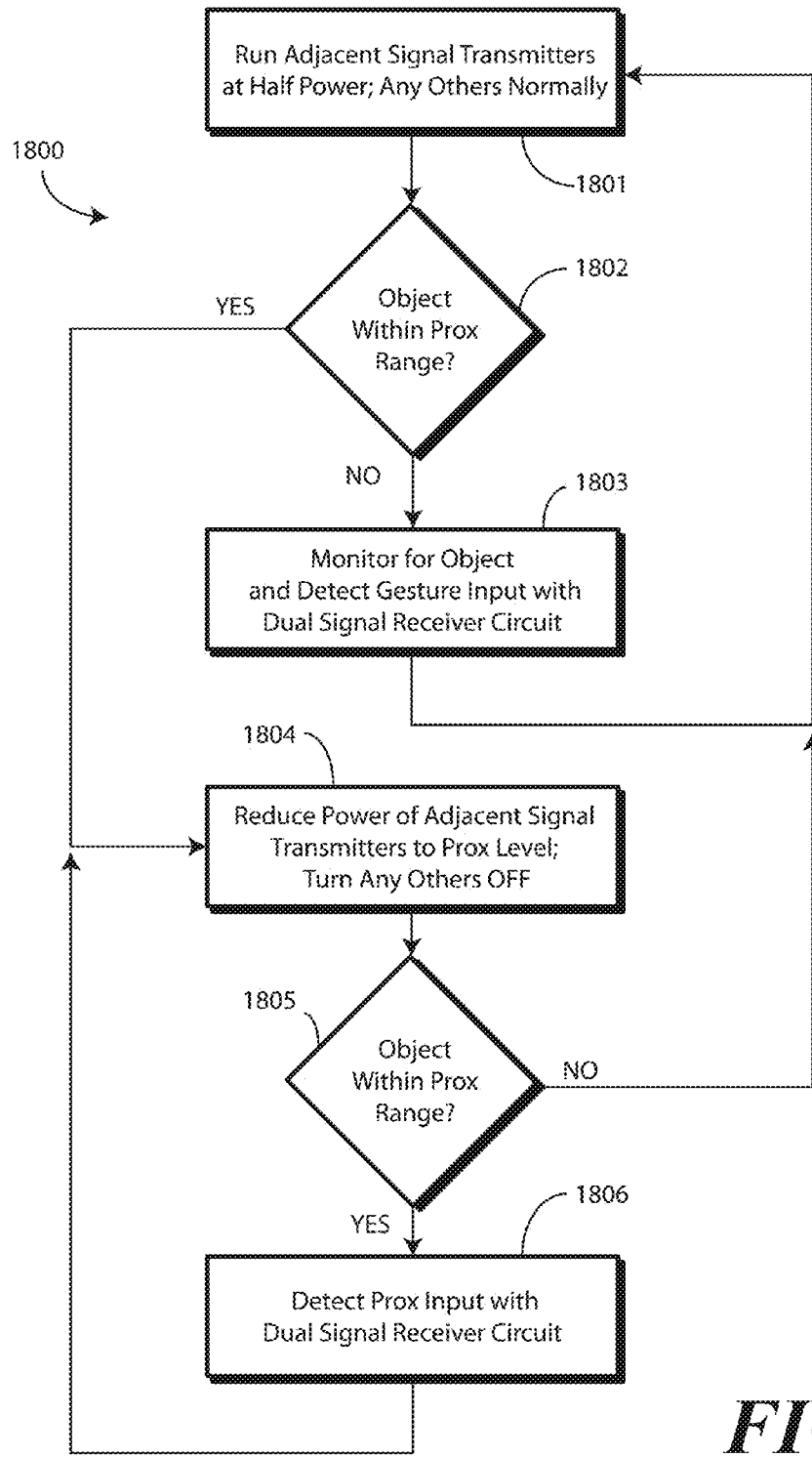
FIG. 18 illustrates an explanatory method in accordance with one or more embodiments of the disclosure.
Figure 19:
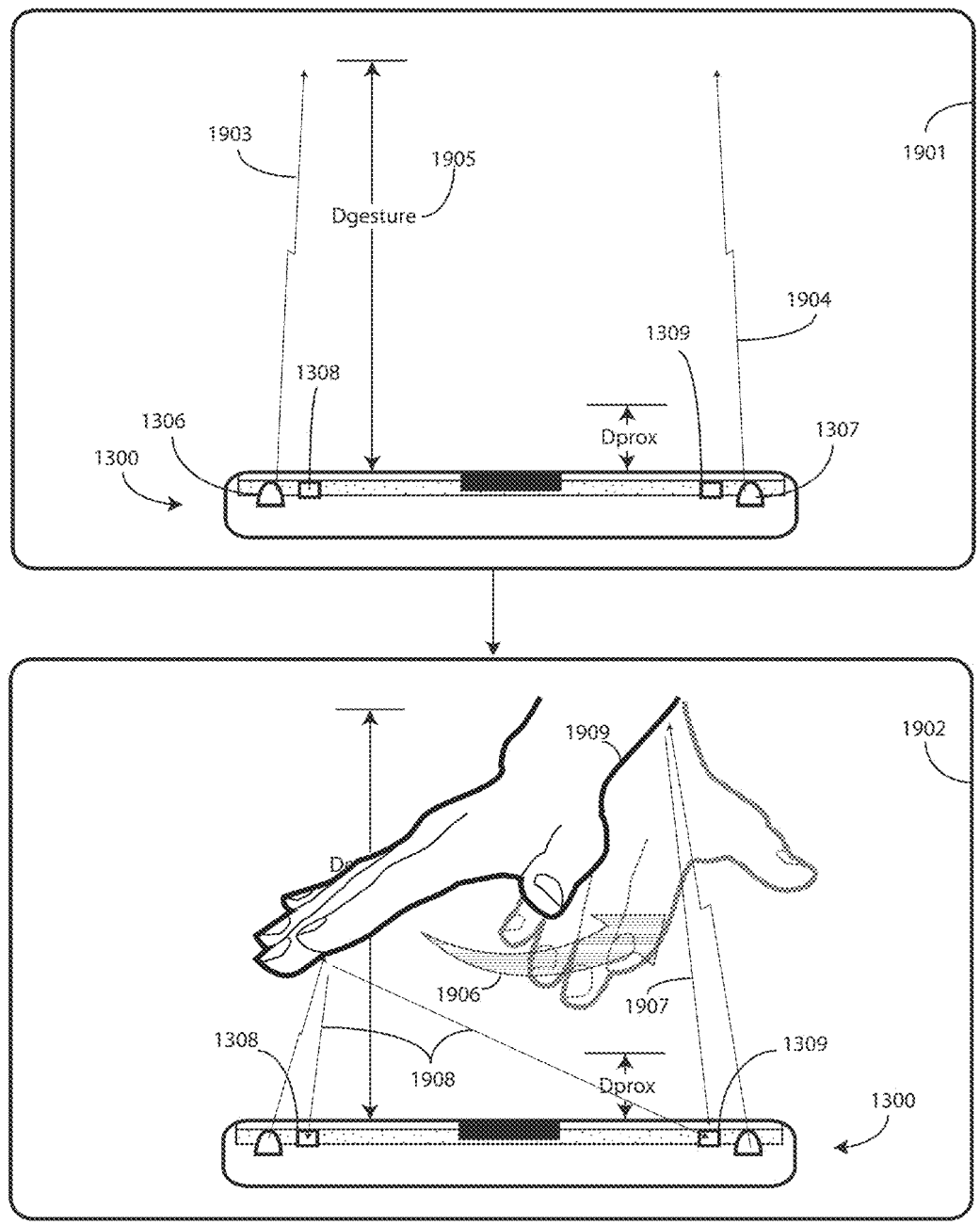
FIG. 19 illustrates one explanatory device detecting gesture input with at least two discrete signal emitters and at least two discrete signal receivers in accordance with one or more embodiments of the disclosure.

Turning to FIG. 18, illustrated therein is a method 1800 suitable for use with the one or more processors (1718) of the portable electronic device (1300) of FIG. 17. Beginning at step 1801, the method 1800 executes in a first mode of operation to detect gesture input. In one embodiment at step 1801, the method 1800 includes driving the first discrete signal emitter (1305) and the second discrete signal emitter (1306) at half power due to the fact that they are proximately located with the first discrete signal receiver (1307) and the second discrete signal receiver (1308), respectively. However, in one embodiment step 1801 includes driving the other discrete signal emitters not proximately located with corresponding signal emitters, e.g., discrete signal emitters 1311,1312, normally at a higher power level. In one embodiment, step 1801 includes driving the first discrete signal emitter (1305) and the second discrete signal emitter (1306) at half power compared to the third discrete signal emitter (1311) and the fourth discrete signal emitter (1312) when operating in the first mode.

At decision 1802, the method 1800 determines whether an object is within a proximity detection range of the portable electronic device (1300). In one embodiment, this proximity detection range is within about three inches of at least one major face (1302) of the portable electronic device (1300). Where this is true, the method 1800 proceeds to step 1804 to enter the second mode of operation detecting objects adjacent to the at least one major face (1302) of the portable electronic device (1300), i.e., proximity input. However, where objects are not within the proximity detection range, but are within the gesture detection range of about nine inches, the method 1800 proceeds to step 1803 while operating in the first mode to detect gesture input.

At step 1803, the method 1800 drives the discrete signal emitters (1305,1307,1311,1312) to emit signals to reflect from objects located within a first distance from the at least one major face (1302) to the discrete signal receivers (1307, 1308) in the first mode of operation. In one embodiment, this first distance is within nine or ten inches of the at least one major face (1302). In so doing, gesture input can be detected.

When the object gets closer to the at least one major face (1302) of the portable electronic device (1300) as determined at decision 1802, the method 1800 proceeds to step 1804 and enters the second mode of operation to detect proximity input. At step 1804, the method 1800 reduces the drive power of both the first discrete signal emitter (1305) and the second discrete signal emitter (1306). In one embodiment, at step 1804 the method turns the third discrete signal emitter (1311) and the fourth discrete signal emitter (1312) OFF when operating in the second mode of operation.

In one embodiment, the method 1800 drives one or both of the first discrete signal emitter (1305) and the second discrete signal emitter (1306) at less power when in the second mode than when in the first mode. In one embodiment, step 1804 includes to driving the first discrete signal emitter (1305) and the second discrete signal emitter (1306) to emit signals to reflect from objects a second distance from the at least one major face (1302) of the portable electronic device (1300) to the discrete signal receivers (1306,1307) when operating in the second mode. In one embodiment, the second distance is less than the first distance. For example, the second distance may be about three inches or less in one embodiment. In so doing, proximity input can be detected by driving the first discrete signal emitter (1305) and the second discrete signal emitter (1306) with less power in the second mode of operation than in the first mode of operation.

This method is shown graphically in FIGS. 19-22. Beginning with FIG. 19, at step 1901 the first discrete signal emitter 1305, the second discrete signal emitter 1306, the third discrete signal emitter (1311), and the fourth discrete signal emitter (1312) are operating in the first mode and emit signals 1903,1904 to reflect from objects a first distance 1905 from the at least one major face 1302 of the portable electronic device 1300 to the two discrete signal receivers 1307,1308. At step 1901, the portable electronic device is operating in the first mode.

Accordingly, at step 1902, the one or more processors (1718) of the portable electronic device 1300 can detect gesture input 1906 by receiving electronic signals from the first discrete signal receiver 1307 and the second discrete signal receiver 1308 corresponding to received, reflected signals 1907,1908 from the user's hand 1909.

Figure 20:
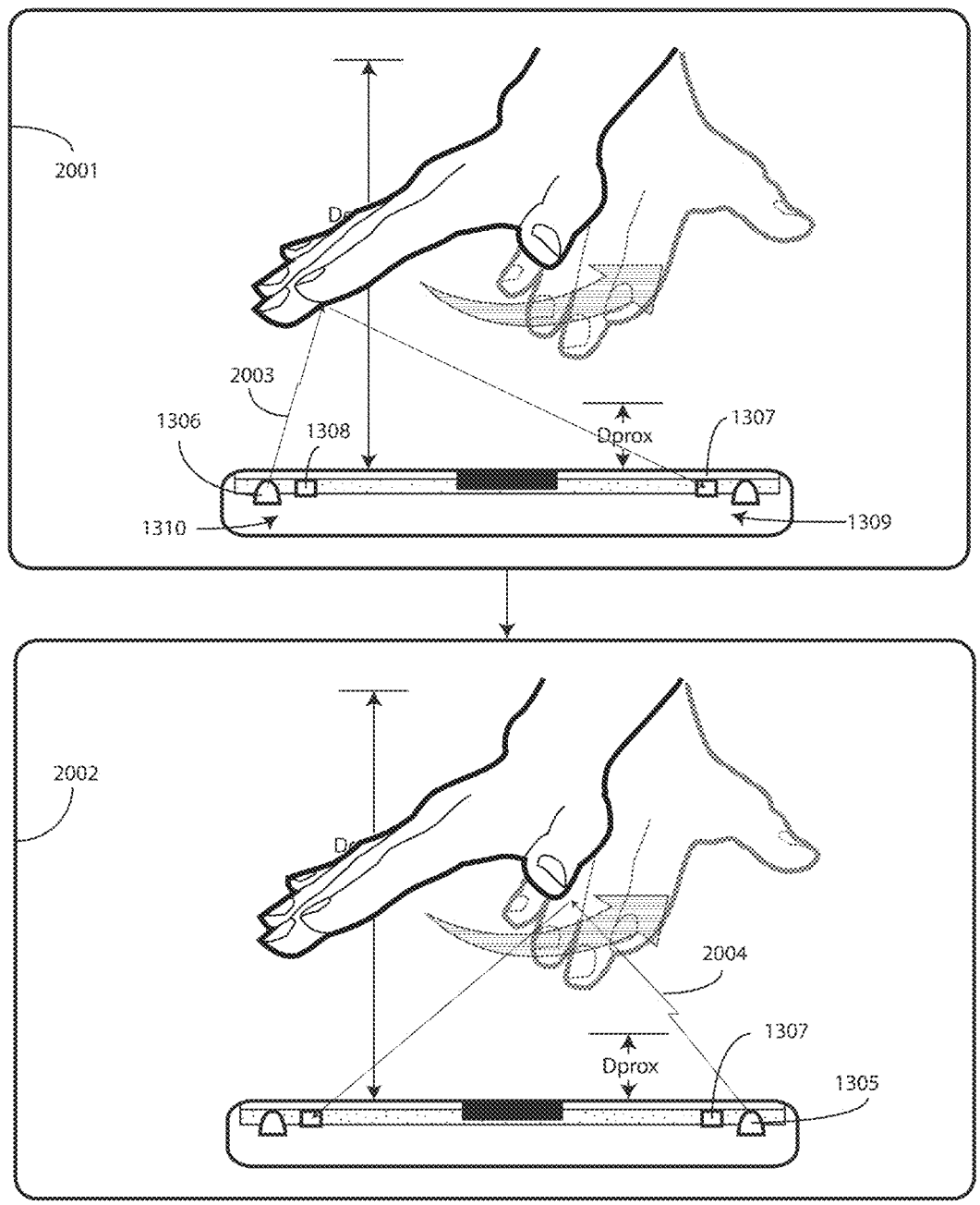
FIG. 20 illustrates one explanatory device detecting gesture input with at least two discrete signal emitters and at least two discrete signal receivers in accordance with one or more embodiments of the disclosure.
Figure 21:
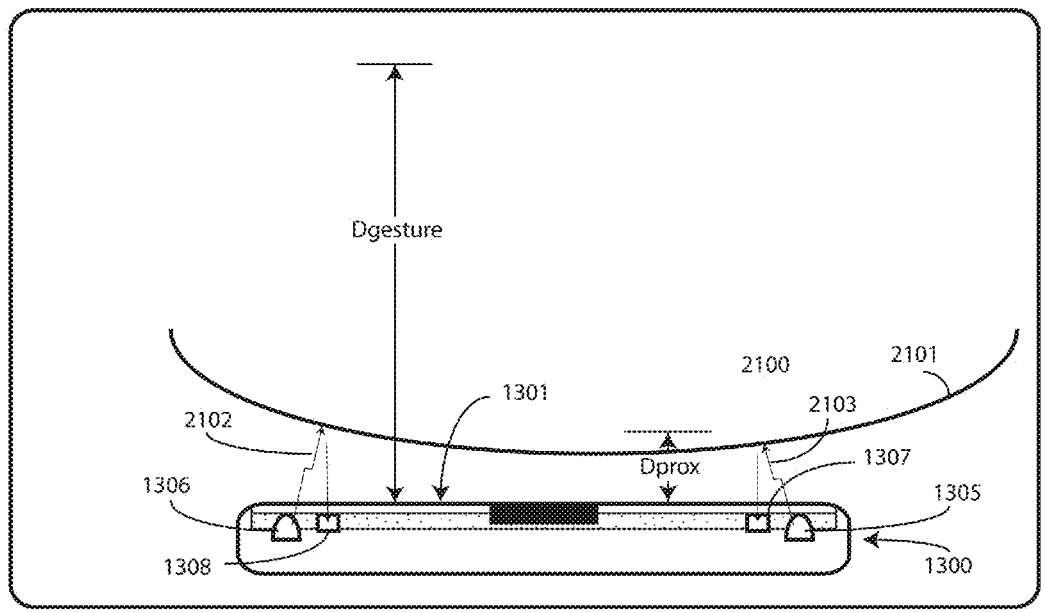
FIG. 21 illustrates one explanatory device detecting the device contacting an object with at least two discrete signal emitters and at least two discrete signal receivers in accordance with one or more embodiments of the disclosure.

FIG. 20 illustrates an alternate method of operating in the first mode. Recall from above that the two primary advantages of using embodiments of the disclosure include, first, the elimination of blind spots, and second, the elimination of local coupling at the first discrete signal emitter-receiver pair 1309 and the second discrete signal emitter-receiver pair 1310. When detecting gesture input, the latter can be further reduced by driving one or both of the discrete signal emitters and/or discrete signal receivers sequentially.

Illustrating by example, at step 2001 the second discrete signal emitter 1306 is emitting a first signal 2003 while the first discrete signal receiver 1307 is active. Accordingly, there is no local coupling between the second discrete signal emitter 1306 and the second discrete signal receiver 1308 since the latter is inactive. Similarly, at step 2002, the first discrete signal emitter 1305 is emitting another signal 2004 while the second discrete signal receiver 1308 is active. Again, there is no local coupling between the first discrete signal emitter 1305 and the first discrete signal receiver 1307 since the latter is inactive. In one embodiment, each discrete signal emitter can be fired in accordance with a time-division multiplex strategy so that each discrete signal emitter fires in succession. The discrete signal receivers can be continually operated during this time, or alternatively can be activated in succession as well. Other configurations will be obvious to those of ordinary skill in the art having the benefit of this disclosure.

Figure 22:
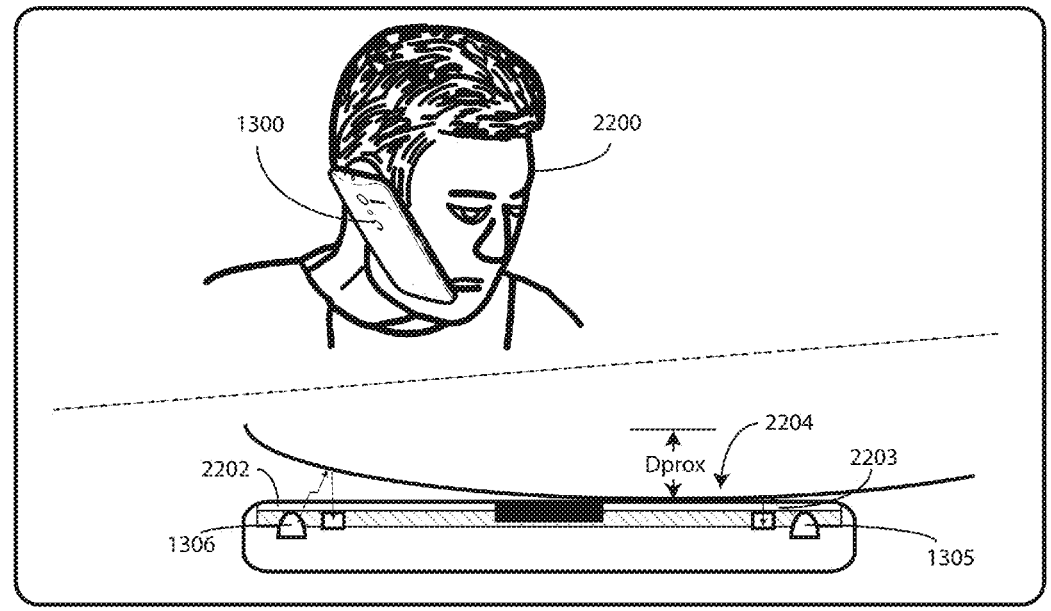
FIG. 22 illustrates one explanatory device detecting the device contacting an object with at least two discrete signal emitters and at least two discrete signal receivers in accordance with one or more embodiments of the disclosure.

Turning now to FIG. 22, the portable electronic device 1300 has entered the second mode of operation to detect proximity input 2204 due to the fact that an object 2101 has come within the proximity detection distance. Accordingly, in one embodiment the power delivered to the discrete signal emitters 1305,1306 is reduced so as to emit other signals 2102,2103 to reflect from the objects 2101 a second distance 2100 from the at least one major face 1302, which is the proximity detection distance. While this is occurring, the detection areas about the discrete signal receivers 1307,1308 intersect within the glass fascia of the portable electronic device 1300 to eliminate blind spots.

The other signals 2102,2013 reflect to the discrete signal receivers 1307,1308 in the second mode so that proximity input can be detected. As shown at FIG. 22, when a user 2200 places the portable electronic device 1300 against his face, as when talking on the phone, at least some of the user's cheek 2201 is adjacent to the glass fascia 2202 of the portable electronic device 1300. As shown, once the object contacts the front surface of the portable electronic device 1300, signals 2203 from one or both discrete signal emitter 1305,1306 reflect entirely through the glass fascia 2202 of the portable electronic device 1300 without ever leaving the portable electronic device 1300.

In summary, embodiments of the disclosure provide circuits, systems, and methods that enable an optimum proximity detection system of detecting both gesture input and proximity input without the need of an expensive proximity detection device (101). Additionally, embodiments of the disclosure offer power savings of up to seventy-five percent compared to prior art systems, and can be used with legacy systems without requiring additional input and/or output terminals of processing circuits. Embodiments of the disclosure reduce blind spots by providing discrete signal emitter-receiver pairs that have detection regions that overlap within the glass fascia of a portable electronic device as well. Embodiments of the disclosure create an angular diversity proximity detection system that improves the detection for right and left hand operation regardless of device tilts, while at the same time solving local coupling and blind spot issues of prior art systems.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A portable electronic device, comprising:
a housing having at least one major face;
one or more processors;
at least two discrete signal emitters, operable with the one or more processors, and disposed along the at least one major face; and
at least two discrete signal receivers, operable with the one or more processors, and disposed along the at least one major face, wherein:
a first discrete signal emitter is proximately located with a first discrete signal receiver to form a first discrete signal emitter-receiver pair disposed at a first corner of the housing;
a second discrete signal emitter is proximately located with a second discrete signal receiver to form a second discrete signal emitter-receiver pair disposed at a second corner of the housing; and
the first discrete signal emitter-receiver pair is distally located along the at least one major face from the second discrete signal emitter-receiver pair.

2. The portable electronic device of claim 1, further comprising a display operable with the one or more processors, the display disposed along the at least one major face.

3. The portable electronic device of claim 2, further comprising an audio output device operable with the one or more processors, the audio output device disposed between the first discrete signal emitter-receiver pair and the second discrete signal emitter-receiver pair.

4. The portable electronic device of claim 1, the at least two discrete signal receivers comprising only two discrete signal receivers.

5. The portable electronic device of claim 4, the first discrete signal receiver and the second discrete signal receiver electrically coupled in parallel.

6. The portable electronic device of claim 5, the one or more processors to operate the at least two discrete signal emitters in one of a first mode to detect gesture input with the at least two discrete signal receivers and a second mode to detect objects adjacent to the at least one major face with the at least two discrete signal receivers.

7. The portable electronic device of claim 6, the at least two discrete signal emitters comprising at least a third signal emitter.

8. The portable electronic device of claim 7, the one or more processors to drive one or both of the first discrete signal emitter and the second discrete signal emitter at less power than the at least a third discrete signal emitter when operating in the first mode.

9. The portable electronic device of claim 8, the one or more processors to drive the first discrete signal emitter and the second discrete signal emitter at half of an operating power of the at least a third discrete signal emitter when operating in the first mode.

10. The portable electronic device of claim 7, the one or more processors to drive one or both of the first discrete signal emitter and the second discrete signal emitter at less power when in the second mode than when in the first mode.

11. The portable electronic device of claim 10, further comprising a display disposed along the at least one major face and an audio output, the audio output, the first discrete signal emitter-receiver pair, and the second discrete signal emitter-receiver pair disposed to a first side of the display, and the audio output disposed between the first discrete signal emitter-receiver pair and the second discrete signal emitter-receiver pair.

12. The portable electronic device of claim 11, the at least a third discrete signal emitter disposed to a second side of the display, the second side opposite the first side.

13. The portable electronic device of claim 11, the first discrete signal receiver and the second discrete signal receiver having a signal receiving surface area of less than four millimeters square.

14. The portable electronic device of claim 11, further comprising an audio output device situated between the first discrete signal emitter-receiver pair and the second discrete signal emitter-receiver pair, thereby providing distal separation between the first discrete signal emitter-receiver pair and the second discrete signal emitter-receiver pair.

15. The portable electronic device of claim 6, the one or more processors to drive the first discrete signal emitter and the second discrete signal emitter sequentially.

16. The portable electronic device of claim 6, the one or more processors to drive the at least two discrete signal emitters to emit signals to reflect from objects a first distance from the at least one major face to the at least two discrete signal receivers in the first mode, and to drive the at least two discrete signal emitters to emit other signals to reflect from other objects a second distance from the at least one major face to the at least two discrete signal receivers in the second mode, the second distance less than the first distance.

17. The portable electronic device of claim 16, the second distance three inches or less.

18. A portable electronic device, comprising:
a first discrete signal emitter proximately located with a first discrete signal receiver;
a second discrete signal emitter proximately located with a second discrete signal receiver;
a third discrete signal emitter;
a fourth discrete signal emitter; and
one or more processors;
the one or more processors to:
    drive the first discrete signal emitter and the second discrete signal emitter with less power than the third discrete signal emitter and the fourth discrete signal emitter in a first mode of operation; and
    drive the first discrete signal emitter and the second discrete signal emitter with more power than the third discrete signal emitter and the fourth discrete signal emitter in a second mode of operation.

19. The portable electronic device of claim 18:
the second discrete signal emitter and the second discrete signal receiver distally located from the first discrete signal emitter and the first discrete signal receiver; and
the one or more processors to detect gesture input in the first mode of operation and proximity input in the second mode of operation.

20. The portable electronic device of claim 19, the one or more processors to drive the first discrete signal emitter and the second discrete signal emitter with less power in the second mode of operation than in the first mode of operation.

* * * * *